(12) United States Patent
Morrison et al.

(10) Patent No.: US 10,480,649 B2
(45) Date of Patent: Nov. 19, 2019

(54) SYSTEM AND METHOD FOR FILLING TORQUE CONVERTER WITH FLUID

(71) Applicant: Ford Global Technologies, LLC, Dearborn, MI (US)

(72) Inventors: Kendrick Morrison, Wayne, MI (US); Timothy Fedullo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 15/894,143

(22) Filed: Feb. 12, 2018

(65) Prior Publication Data
US 2019/0249773 A1   Aug. 15, 2019

(51) Int. Cl.
*F16H 61/64* (2006.01)
*F15B 1/033* (2006.01)
*F16H 45/02* (2006.01)
*F16H 61/00* (2006.01)

(52) U.S. Cl.
CPC ............. *F16H 61/64* (2013.01); *F15B 1/033* (2013.01); *F16H 45/02* (2013.01); *F16H 61/0031* (2013.01); *F16H 2045/0215* (2013.01); *F16H 2061/0053* (2013.01)

(58) Field of Classification Search
None
See application file for complete search history.

(56) References Cited

U.S. PATENT DOCUMENTS

| 8,308,608 | B2 | 11/2012 | Wilke et al. | |
| 9,354,140 | B2 | 5/2016 | Arnold et al. | |
| 2010/0292900 | A1* | 11/2010 | Shimozato | F16D 48/02 701/53 |
| 2017/0009877 | A1* | 1/2017 | Ichimura | F16H 61/0206 |

FOREIGN PATENT DOCUMENTS

CN   203285943 U   11/2013

* cited by examiner

*Primary Examiner* — Timothy Hannon
(74) *Attorney, Agent, or Firm* — David Kelley; Brooks Kushman, P.C.

(57) ABSTRACT

A vehicle includes a transmission having a torque converter, a device configured to generate line pressure, and at least one fluid path connecting the device in fluid communication with the torque converter. A controller is programmed to, responsive to an engine-off time exceeding a threshold and a parameter indicative of departure being present, command the device to generate line pressure so that fluid is supplied to the torque converter. The device may be a transmission pump or an accumulator.

20 Claims, 4 Drawing Sheets

SYSTEM AND METHOD FOR FILLING TORQUE CONVERTER WITH FLUID

TECHNICAL FIELD

This disclosure relates to the field of automatic transmissions for motor vehicles. More particularly, the disclosure pertains to systems and methods for quickly filling a torque converter with fluid after drain-down has occurred.

BACKGROUND

Many vehicles are used over a wide range of vehicle speeds, including both forward and reverse movement. Most engines operate efficiently only within a narrow range of speeds. Consequently, transmissions capable of efficiently transmitting power at a variety of speed ratios are frequently employed. When the vehicle is at low speed, the transmission is usually operated at a high-speed ratio such that it multiplies the engine torque for improved acceleration. At high vehicle speed, operating the transmission at a low speed ratio permits an engine speed associated with quiet, fuel efficient cruising.

Automatic transmissions may include a torque converter for coupling a transmission input shaft to a crankshaft of the engine. To improve power-transfer efficiency, a controller may engage a bypass clutch to mechanically couple the transmission input shaft to the case of the torque converter, which is fixed to the flywheel of the engine. The bypass clutch may include one or more clutch plates that rotate with the case and are interleaved with one or more plates that rotate with the input shaft. To engage the clutch, pressurized fluid forces a piston to compress the clutch plates.

Most torque converters leak fluid to the transmission sump over time. This is referred to as torque converter drain-down. Systems and methods are disclosed herein for quickly filling the torque converter to minimize any negative effects of torque converter drain-down.

SUMMARY

According to one embodiment, a method of refilling a torque converter of a vehicle includes, responsive to an engine-off time exceeding a threshold and a parameter indicative of departure being present, filling the torque converter with fluid. The parameter indicative of departure may include the vehicle being unlocked, a door being opened, detection of a key within the vehicle, or a brake pedal being depressed.

According to another embodiment, a vehicle includes a transmission having a torque converter, a device configured to generate line pressure, and at least one fluid path connecting the device in fluid communication with the torque converter. A controller is programmed to, responsive to an engine-off time exceeding a threshold and a parameter indicative of departure being present, command the device to generate line pressure so that fluid is supplied to the torque converter. The device may be a transmission pump or an accumulator.

According to yet another embodiment, a vehicle includes a transmission having a torque converter, a valve body, and first and second fluid paths connecting between the torque converter and the valve body. A controller is programmed to, responsive to engine-off time exceeding a threshold, supply fluid to the torque converter via the first fluid path, and, responsive to the engine-off time being less than the threshold, supply fluid to the torque converter via the second fluid path.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
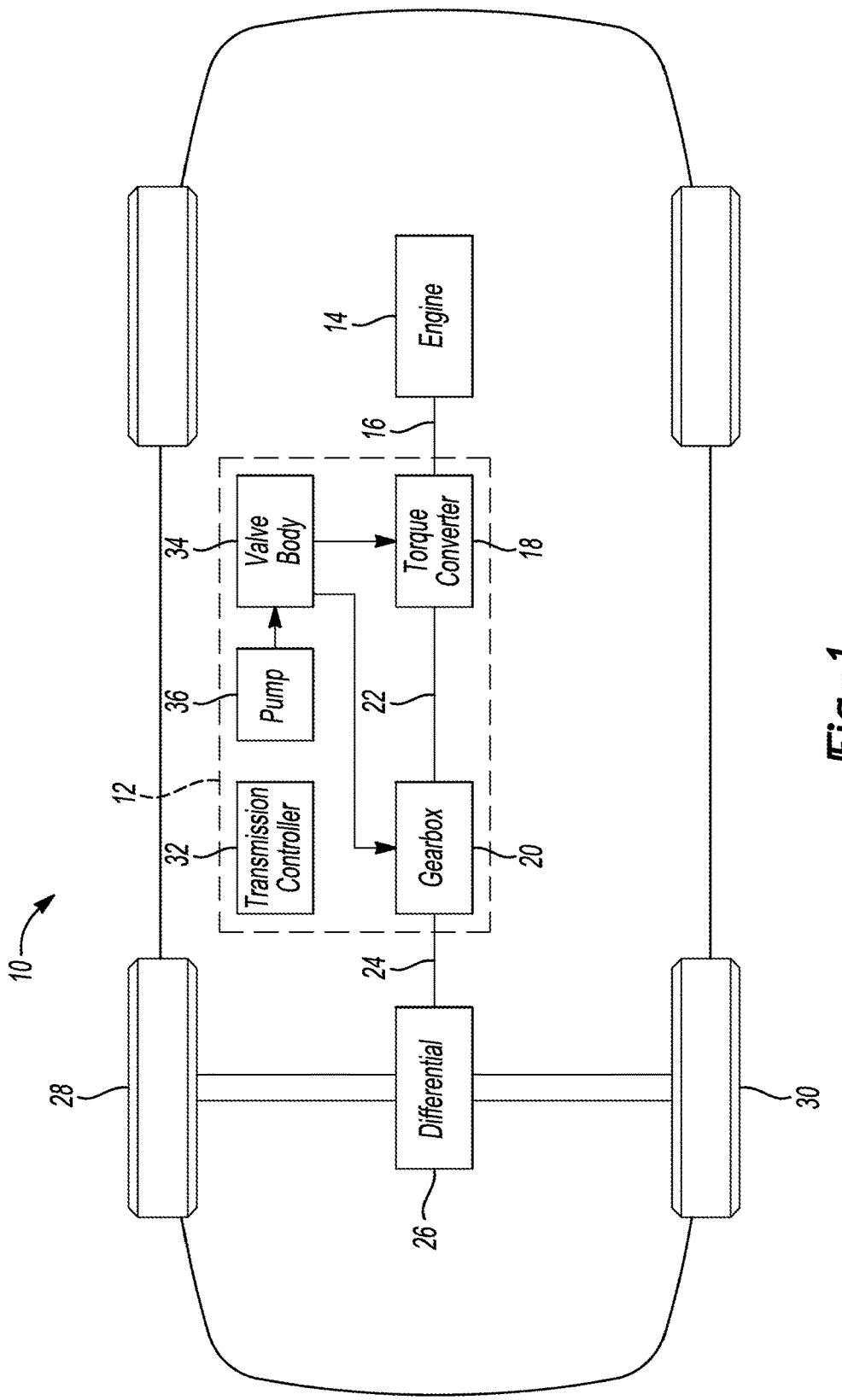
FIG. 1 is a schematic representation of a vehicle powertrain.

FIG. 1 illustrates a vehicle 10 having a transmission 12. Power is generated by an engine (or other powerplant) 14 and conveyed to an engine output 16. A torque converter 18 and a gearbox 20 modify the speed and torque at which the power is delivered to match vehicle requirements while permitting the engine 14 to run at a suitable crankshaft speed. Power flows from the torque converter 18 to the gearbox 20 via a turbine shaft 22 (also known as a transmission input shaft). A driveshaft 24 transfers power from the transmission 12 to a differential 26. The differential 26 distributes the power between drive wheels 28 and 30 while allowing slight speed differences during cornering. Some transmissions, such as front-wheel-drive transaxles, may include the differential in the same housing with the gearbox and the torque converter. In such transmissions, power transfer to the differential may utilize gears or chains as opposed to a driveshaft. In some vehicles, a transfer case may be interposed between the transmission and differential to transfer some power to additional wheels.

A transmission controller 32 adjusts the state of transmission 12 based on various inputs, including vehicle speed measurements, driver torque demand as indicated by accelerator pedal position, and a gear selector. The controller 32 may adjust the state of the transmission by sending electrical signals to a valve body 34 and components associated therewith. In response to these signals, the valve body 34 adjusts the pressure in hydraulic circuits to engage particular clutches, such as clutches within the gearbox 20 and a bypass clutch within the torque converter 18. A transmission pump 36 generates the fluid pressure used to operate the transmission 12. The transmission pump 36 is in fluid communication with the valve body 34, which routes line pressure generated by the pump 36 to other component, e.g., clutches, torque converter, solenoids, and the like. The pump 36 may be mechanical or electrical. In some embodiments, the transmission may include a primary pump that is typically mechanical and an auxiliary pump that is typically electrical.

While illustrated as one controller, the controller 32 may be part of a larger control system and may be controlled by various other controllers throughout the vehicle 10, such as a vehicle-system controller (VSC). It is to be understood that the controller 32 and one or more other controllers can collectively be referred to as a "controller" that controls various actuators in response to signals from various sensors to control functions such operating the transmission 12. The controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 32 may communicate signals to and/or from the engine 14, the gearbox 20, the valve body 34 and others. Although not explicitly illustrated, those of ordinary skill in the art will recognize various functions or components that may be controlled by controller 32 within each of the subsystems identified above.

Figure 2:
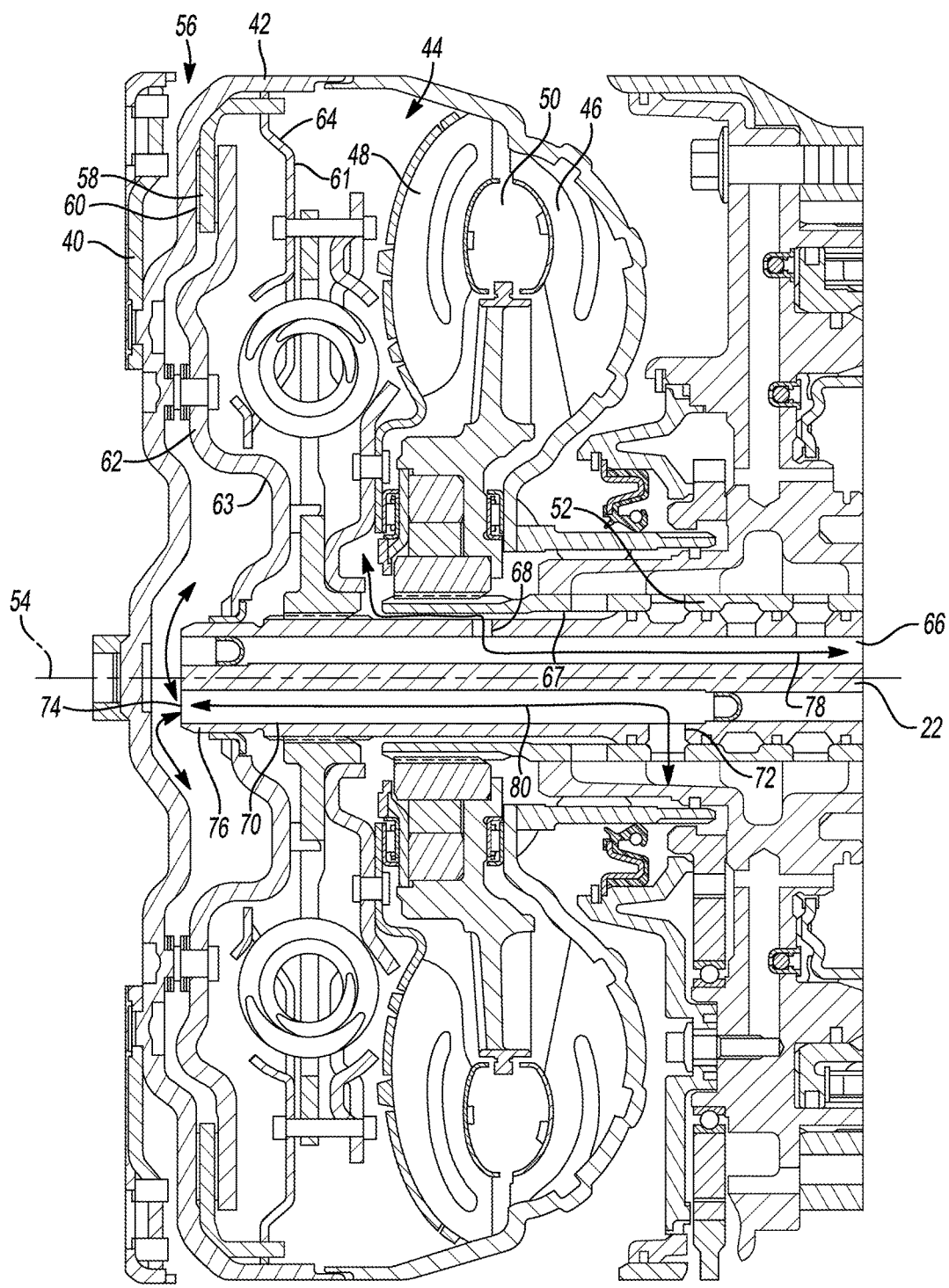
FIG. 2 is a cross section of a torque-converter assembly.

Referring to FIG. 2, a front portion of the transmission 12 is shown. The torque converter 18 may include a case 42 attached to a flywheel of the engine by a flex plate 40. The torque converter 18 may also be attached to an output shaft of an electric motor or other powerplant in other embodiments. The torque converter 18 includes an impeller 46 fixed with the case 42. The case 42 defines a hydrodynamic chamber 44 that is filled with fluid, e.g., oil (commonly called transmission fluid), during operation of the transmission 12. A turbine 48 is disposed within the chamber 44 adjacent to the blades of the impeller 46, and is connected (e.g., splined) to a turbine shaft 22. A torsional damper may be interposed between turbine 48 and the turbine shaft 22 to isolate the gearbox 20 and other driveline components from engine vibrations.

A stator 50 is coupled to a stator shaft 52 via a one-way clutch. The stator shaft 52 is fixed to a front support of the transmission 12 and is stationary relative to the torque converter 18. When the turbine shaft 52 is stationary or rotating slowly relative to the crankshaft of the engine 14, the one-way clutch holds the stator 50 stationary. Rotation of the impeller 46 forces fluid to move between the impeller 46, the turbine 48, and the stator 50. The fluid exerts a hydrodynamic torque on the turbine 48. The stator 50 provides a reaction force such that the torque on the turbine 48 can be greater than the torque on the impeller 46. When the speed of the turbine 48 approaches that of the impeller 46, fluid tends to flow around the centerline 54, causing the one-way clutch to overrun.

The torque converter 18 includes a bypass clutch 56 disposed within the hydrodynamic chamber 44. The clutch 56 may include a clutch plate 58 having friction elements 60 configured to engage with the case 42 and a piston 62 of the clutch 56. The clutch plate 58 may be connected with the turbine shaft 22 via a clutch shell 64. A dampener may be disposed on the clutch shell 64. The clutch 56 is engaged by supplying fluid into the hydrodynamic chamber 44 on an apply side 61 of the piston 62, and is disengaged by supplying fluid on a release side 63 of the piston 62.

The turbine shaft 22 may define a plurality of internal passageways used to transport fluid, between various components of the transmission 12. At least two of these passageways are in fluid communication with the hydrodynamic chamber 44 of the torque converter. For example, a first of these passageways 66 extends through the turbine shaft 22 and supplies fluid to the hydrodynamic chamber 44 via a first orifice 68. Fluid is permitted to flow out of the first orifice 68, into a second passageway 67 defined between the stator shaft 52 and the turbine shaft 22, and into the hydrodynamic chamber 44 near the clutch shell 64. The first passageway 66 is in fluid communication with the valve body 34 via one or more other passageways (not shown). This may be referred to as the clutch-apply fluid path 78, which supplies fluid into the hydrodynamic chamber 44 on the apply side 61 of the piston 62. A third of these passageways 70 is defined by the turbine shaft 22 and extends to the front end 76 of the turbine shaft 22. The passageway 70 includes an opening 74 disposed within the hydrodynamic chamber 44. An orifice 72 allows fluid to enter/exit the third passageway 70. The third passageway 70 is in fluid communication with the valve body 34 via one or more other passageways (not shown). This may be referred to as the clutch-release fluid path 80, which supplies fluid into the hydrodynamic chamber 44 on the release side 63 of the piston 62.

Depending upon the desired engagement state of the clutch 56, fluid is supplied to the hydrodynamic chamber 44 via either the clutch-apply fluid path 78 or the clutch-release fluid path 80, and is returned to the transmission sump via the other of the clutch-apply fluid path 78 or the clutch-release fluid path 80. If the clutch is not being engaged, fluid is normally supplied to the torque converter 18 via the fluid path 80, and fluid exits the torque converter via the fluid path 78. Conversely, if the clutch is being engaged, fluid is supplied to the torque converter 18 via the fluid path 78 and exits via the fluid path 80. The plumbing of the transmission 12 may be configured so that flow rate of fluid through path 78 is greater than the flow rate of fluid through path 80.

To engage the clutch 56, pressurized fluid is routed to chamber 44 via the fluid path 78 forcing the piston 62 to compress the clutch plate 58 against the case 42. When the clutch plate 58 is compressed, frictional engagement occurs locking the turbine shaft 22 with the case 42 bypassing the fluid-coupling power path. The clutch 56 is released by routing fluid to the chamber 44 via the fluid path 80 to push the piston 62 away from the case 42. Once the clutch disengages, the fluid-coupling power path resumes.

Fluid may leak from the hydrodynamic chamber 44 to the transmission sump over time via the passageways, orifices, seals, and the like. This is known as torque converter drain-down. In typical designs, a torque converter will drain-down to approximately halfway full during extended periods of nonuse. The amount of time it takes for a torque converter to drain-down depends on the design of the torque converter and may be anywhere from a series of hours to a series of days or weeks.

Torque converters transmit power from the impeller to the turbine via a fluid coupling. Proper fluid coupling requires the torque converter to have a sufficient amount of fluid within the hydrodynamic chamber. If the hydrodynamic chamber is low on fluid, torque transfer between the impeller and the turbine is reduced until the torque converter is refilled. Refill times vary by torque converter design and the amount of drain-down that has occurred, but it is not uncommon for current production torque converts to require 20 seconds or more to refill the torque converter. During this time, driver-demanded torque will not be provided to the driven wheels leading to an unsatisfactory driving experience.

This disclosure sets forth systems and methods for more quickly refilling a drained-down torque converter to improve the driving experience. Control logic or functions performed by the controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle may be configured to normally supply fluid to the torque converter 18 via the clutch-release fluid path 80, and to supply fluid to the torque converter 18 via the clutch-apply fluid path 78 only under select conditions. For example, fluid is supplied via the clutch-apply fluid path 78 when the bypass clutch 56 is to be engaged. While the primary purpose of the clutch-apply path 78 is to engage the clutch 56, the higher flow rates provided by the clutch-apply path 78 can be advantageously used in other circumstances, such as to more quickly refill the torque converter 18 following drain-down. Testing has shown, for at least one example transmission, that refill times for the torque converter are reduced from 13 seconds to 2 seconds when the clutch-apply path 78 is used to supply fluid to the torque converter instead of the clutch-release fluid path 80 following drain-down. Reducing torque-converter refill times below 5 seconds substantially decreases the likelihood of a driver attempting to propel the vehicle prior to the torque converter being refilled.

Figure 3:
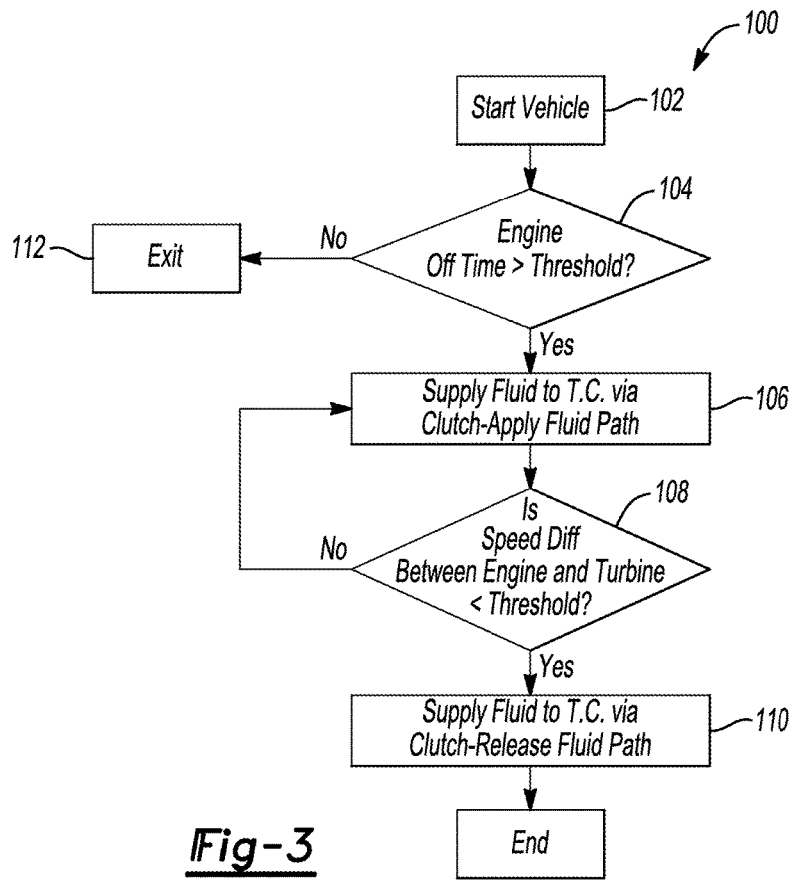
FIG. 3 is a flow chart of an algorithm for operating a transmission.

FIG. 3 is a flowchart 100 of an algorithm for supplying fluid to the torque converter following engine start. The flowchart begins at operation 102 when the vehicle is started by the driver. Control passes to operation 104 where the controller determines if the engine-off time is greater than a threshold time. (Engine-off time is the amount of time the engine has been in nonuse following the last key OFF.) Engine times exceeding the threshold time are indicative of at least some torque converter drain-down being present. The threshold time may be design dependent as different torque converters drain-down at different rates. Vehicle designers, through testing and calibration, may determine an appropriate threshold time for the torque converter.

If yes at operation 104, control passes to operation 106 and fluid is supplied to the torque converter via the clutch-apply fluid path. At operation 106, the controller may command the valve body to route pressurized fluid to the clutch-apply path.

The controller continues to supply fluid to the torque converter via the clutch-apply path until the torque converter is sufficiently refilled. This may be determined by monitoring the speed difference between the engine and the turbine. The engine speed may be measured by an engine speed sensor that senses the speed of the crankshaft and the turbine may be measured a speed sensor disposed in the transmission.

In the illustrated embodiment, the controller determines if a speed difference between the engine and the turbine is less than a threshold speed at operation 108. If the speed difference is less than the threshold, then sufficient fluid coupling is occurring between the turbine and the impeller indicating sufficient fluid in the torque converter.

If no at operation 108, control loops back to operation 106 and the torque converter continues to be filled via the clutch-apply path. If yes, control passes to operation 110 and fluid is supplied to the torque converter via the clutch-release fluid path. At operation 110, the controller may command the valve body to route pressurized fluid to the clutch-release path and prevent pressurized fluid from being routed to the clutch-apply path.

Once the torque converter is refilled, the controls 100 are ended until the next key cycle. Fluid is then supplied to the torque converter based on the commanded engagement state of the bypass clutch. For example, the controller may be programmed to default to supplying fluid to the torque converter via the clutch-release fluid path so that power is transferred by the fluid-power path, and further programmed to, responsive to a request to engage the bypass clutch, supply fluid to the torque converter via the clutch-apply fluid path. Controls are exited at operation 112 if no at operation 104.

Figure 4:
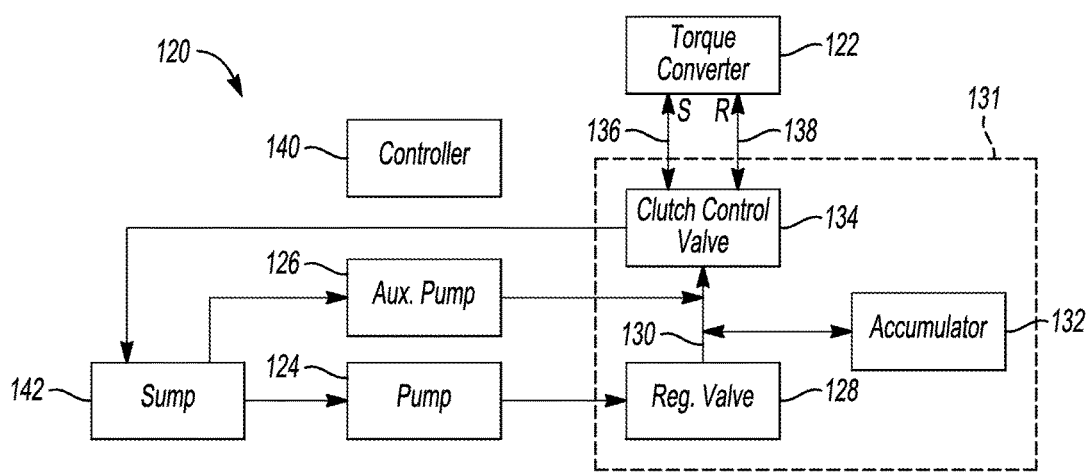
FIG. 4 is a schematic representation of a transmission.

Referring to FIG. 4, a transmission 120 according to another embodiment includes a torque converter 122 that may be the same or similar to the torque converter 18. The transmission 120 may include a primary pump 124 and an auxiliary pump 126. The primary pump 124 may be mechanical and the auxiliary pump 126 may be electric. The auxiliary pump 126 may be energized when the engine is OFF so that fluid pressure (commonly referred to as line pressure) can be generated for the transmission during this time. The auxiliary pump 126 may be particularly beneficial for hybrid vehicles and stop-start vehicles, which operate with the engine OFF.

The pumps 124, 126 provide pressurized fluid to the valve body 130. More specifically, the primary pump 124 supplies fluid to a regulator valve 128 that controls the fluid pressure of the mainline 130. The auxiliary pump 126 is in fluid communication with the mainline 130 and does may not require a regulator valve. An accumulator 132 is configured to store fluid pressure for use when the pumps 124 and 126 are off. The accumulator 132 is in fluid communication with mainline 130. The transmission 120 may not include both the auxiliary pump 126 and the accumulator 132 in all embodiments, but in others, both may be included.

The torque converter 122, depending upon its design, is connected to the mainline 130 by at least one fluid path. The torque converter 122 may be the same or similar to torque converter 18. If the torque converter does not include a bypass clutch, then fluid by be supplied by a single fluid path. If the torque converter includes a bypass clutch, at least two fluid paths are provided. For example, a clutch-apply fluid path 136 circulates fluid to the torque converter 122 when the bypass clutch is to be engaged, and a clutch-release fluid path 138 circulates fluid to the torque converter 122 when the bypass clutch is to be disengaged. The paths 136, 138 may be similar to those described above. Also, as described above, fluid may be circulated to the torque converter 122 via the clutch-apply path 136 to quickly refill the torque converter 122 mitigating the effects of drain-down.

A clutch-control valve 134 may be used to control which path supplies fluid to the torque converter 122. The control valve 134 may be omitted if a single path is used to supply fluid to the torque converter. The clutch-control valve 134 is connected to the mainline 130. While not shown, several other components may also be connected to the mainline 130. The clutch-control valve 134 is configured to circulate fluid returned from the torque converter 122 to the transmission sump 142.

A controller 140 is configured to control operation of the transmission 120. The controller 140 may be similar to the controller 32 but may include additional or different programming as will be described below. The controller 140 may be programmed to actuate the clutch-control valve 134 so that fluid is supplied to the torque converter 122 via the clutch-release path 138 when the torque converter is filled with oil and the bypass clutch is commanded to be disengaged. When fluid is supplied to the torque converter via release path 138, fluid returns from the torque converter 122 to the clutch-control valve 134 via the apply path 136. The controller 140 is further programmed to actuate the clutch-controlled valve 134 so that fluid is supplied to the torque converter 122 via the clutch-apply path 136 when the bypass clutch is commanded to be engaged, and when conditions indicative of torque converter drain-down are present. Fluid is returned to the control valve 134 via the fluid path 138 when fluid is supplied via path 136.

Figure 5:
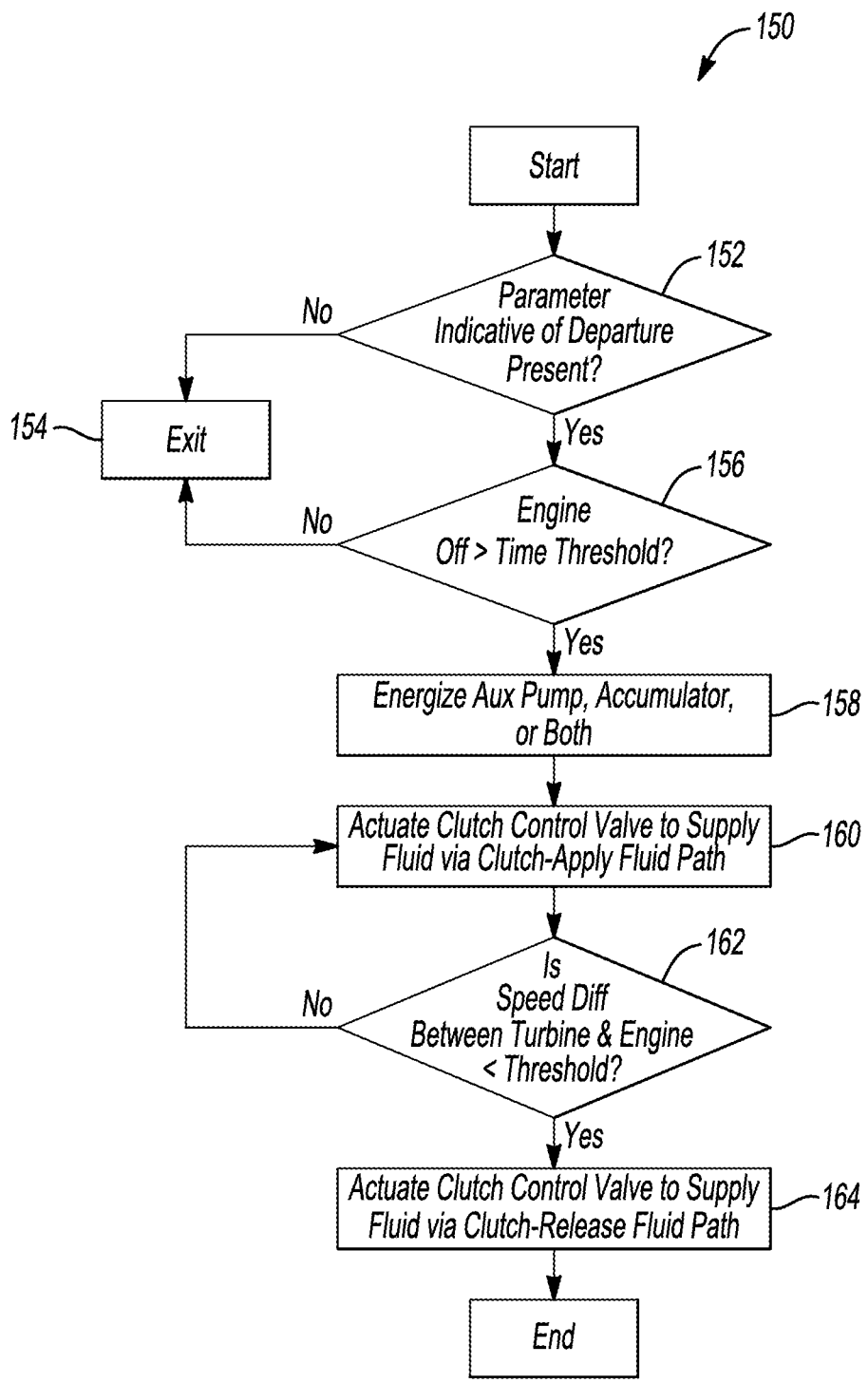
FIG. 5 is another flow chart of an algorithm for operating a transmission.

FIG. 5 illustrates a flow chart 150 of an algorithm for operating the transmission 120. Control begins at operation 152 and the controller determines if a parameter indicative of vehicle departures is present. Example parameters include a vehicle door, e.g., driver door, being opened, the vehicle being unlocked, a brake pedal being depressed, the parking brake being released, a key being detected within the vehicle.

If no at operation 152, the controls are exited at operation 154. If yes, control passes to operation 156 and the controller determines if an engine off time is greater than a time threshold. If no, control is exited. If yes, control passes to operation 158 and the controller energizes the auxiliary pump, the accumulator, or both depending upon the design of the transmission. By energizing a device, e.g., the auxiliary pump or the accumulator, in response to the parameter indicative departure being present the torque converter can be primed with fluid prior to the engine being started. This allows the torque converter to be sufficiently filled by the time the driver is ready to propel the vehicle.

At operation 160, the controller actuates the clutch-control valve to apply fluid to the torque converter via the clutch-apply fluid path to decrease the fill time of the torque converter as compared to supplying fluid via the clutch-release fluid path. At operation 162, the controller determines if a speed difference between the turbine and the engine is less than a threshold. If yes, this is indicative that the torque converter is sufficiently filled with fluid and control passes operation 164. If no, control loops back to operation 160 and fluid is continued to be supplied via the clutch-apply path. At operation 164, the controller actuates the clutch-control valve to supply fluid to the torque converter via the clutch-release fluid path. Operators 162 to 164 are optional.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of refilling a torque converter of a vehicle comprising:
   via a controller: responsive to an engine-off time exceeding a threshold and a parameter indicative of departure being present, filling the torque converter with fluid.

2. The method of claim 1, wherein the filling the torque converter includes energizing a transmission pump to supply the fluid to the torque converter.

3. The method of claim 2, wherein the transmission pump is electric.

4. The method of claim 1, wherein the filling the torque converter includes discharging an accumulator to supply the fluid to the torque converter.

5. The method of claim 1, wherein the filling the torque converter includes:
   supplying fluid to the torque converter via a first fluid path, and
   responsive to a speed difference between an engine and a turbine of the torque converter being less than a threshold, (i) ceasing to supply fluid via the first path, and (ii) supplying fluid to the torque converter via a second fluid path.

6. The method of claim 1, wherein the parameter indicative of departure includes the vehicle being unlocked, a door being opened, detection of a key within the vehicle, or a brake pedal being depressed.

7. The method of claim 1, wherein the filling the torque converter is further responsive the vehicle being OFF.

8. A vehicle comprising:
a transmission including a torque converter, a valve body, and first and second fluid paths connecting between the torque converter and the valve body; and
a controller programmed to, responsive to engine-off time exceeding a threshold, supply fluid to the torque converter via the first fluid path, and, responsive to the engine-off time being less than the threshold, supply fluid to the torque converter via the second fluid path.

9. The vehicle of claim 8, wherein the torque converter further includes a bypass clutch.

10. The vehicle of claim 9, wherein the controller is further programmed to, responsive to a request to engage the clutch, supply the fluid to the torque converter via the first fluid path.

11. The vehicle of claim 10, wherein the controller is further programmed to, responsive to a request to disengage the clutch, supply the fluid to the torque converter via the second fluid path.

12. The vehicle of claim 9, wherein the bypass clutch includes an apply side and a release side, and wherein the first fluid path has an orifice located on the apply side and the second fluid path has an orifice located on the release side.

13. The vehicle of claim 8, wherein the torque converter includes a turbine and an impeller fixed to an engine, and wherein the controller is further programmed to, responsive to a speed difference between the engine and the turbine being less than a threshold, supply fluid to the torque converter via the second fluid path.

14. A vehicle comprising:
a transmission including a torque converter, a device configured to generate line pressure, and at least one fluid path connecting the device in fluid communication with the torque converter; and
a controller programmed to, responsive to an engine-off time exceeding a threshold and a parameter indicative of departure being present, command the device to generate line pressure so that fluid is supplied to the torque converter.

15. The vehicle of claim 14, wherein the command the device is further responsive to the vehicle being OFF.

16. The vehicle of claim 14, wherein the device is an electric transmission pump or an accumulator.

17. The vehicle of claim 14 further comprising a clutch-control valve configured to receive the line pressure, and wherein the at least one fluid path includes a clutch-apply fluid path and a clutch-release fluid path that are each connected between the clutch-control valve and the torque converter, and wherein the clutch-control valve is actuatable to supply fluid to the torque converter via either the clutch-apply path or the clutch-release path.

18. The vehicle of claim 17, wherein the controller is further programmed to, command the clutch-control valve to supply fluid to the torque converter via the clutch-apply path, and, responsive to a speed difference between an engine and a turbine being less than a threshold, command the valve to supply fluid to the torque converter via the clutch-release path.

19. The vehicle of claim 18, wherein the clutch-apply path has a higher flow rate than the clutch-release path.

20. The vehicle of claim 14, wherein the parameter indicative of departure includes the vehicle being unlocked, a door being opened, detection of a key within the vehicle, or a brake pedal being depressed.

* * * * *